(12) United States Patent
Satake et al.

(10) Patent No.: US 7,232,607 B2
(45) Date of Patent: Jun. 19, 2007

(54) THERMALLY FOAMABLE MICROSPHERE AND PRODUCTION PROCESS THEREOF

(75) Inventors: Yoshikatsu Satake, Fukushima (JP); Genzo Asai, Fukushima (JP)

(73) Assignee: Kureha Corporation, Tokyo (JP)

( * ) Notice: Subject to any disclaimer, the term of this patent is extended or adjusted under 35 U.S.C. 154(b) by 223 days.

(21) Appl. No.: 10/258,790

(22) PCT Filed: Apr. 2, 2001

(86) PCT No.: PCT/JP01/02854

§ 371 (c)(1), (2), (4) Date: Oct. 28, 2002

(87) PCT Pub. No.: WO01/83636

PCT Pub. Date: Nov. 8, 2001

(65) Prior Publication Data

US 2003/0143399 A1    Jul. 31, 2003

(51) Int. Cl.
*B32B 5/16* (2006.01)

(52) U.S. Cl. ............ 428/402.22; 521/56; 523/210

(58) Field of Classification Search ........... 428/402.22; 521/56; 523/210; 524/114, 392, 525, 574
See application file for complete search history.

(56) References Cited

U.S. PATENT DOCUMENTS 5,520,961 A    5/1996    Lysell et al.
6,550,508 B1    4/2003    Yamaguchi et al.
6,613,810 B1    9/2003    Ejiri et al.

FOREIGN PATENT DOCUMENTS

| EP | 0566367 | 10/1993 |
|---|---|---|
| EP | 0572233 | 12/1993 |
| EP | 1054034 | 11/2000 |
| EP | 1059339 | 12/2000 |
| JP | 42-26524 B | 12/1977 |
| JP | 62286534 | 12/1987 |
| JP | 4178442 | 6/1992 |
| JP | 5-15499 B | 3/1993 |
| JP | 05-285376 | 11/1993 |
| JP | 11-060868 | 3/1999 |
| JP | 2894990 | 3/1999 |
| JP | 2000-017103 | 1/2000 |
| JP | 2000-024488 | 1/2000 |
| JP | 2000024488 | 1/2000 |
| WO | 99/37706 | 7/1999 |
| WO | 9943758 | 9/1999 |

*Primary Examiner*—Peter D. Mulcahy
(74) *Attorney, Agent, or Firm*—Dinsmore & Shohl LLP

(57) ABSTRACT

The invention provides a thermally foamable micro-sphere whose shell is formed of a polymer that is obtained by the polymerization of a polymerizable monomer and a crosslinkable monomer at a proportion of greater than 1% by weight up to 5% by weight based on the polymerizable monomer and which has a maximum expansion ratio of at least 5. The invention also provides a process for the production of a thermally foamable microsphere having a maximum expansion ratio of at least 5 by the suspension polymerization of a polymerizable mixture containing a crosslinkable monomer at a proportion of greater than 1% by weight up to 5% by weight based on the polymerizable monomer.

22 Claims, 2 Drawing Sheets

THERMALLY FOAMABLE MICROSPHERE AND PRODUCTION PROCESS THEREOF

TECHNICAL FIELD

The present invention relates generally to a thermally foamable microsphere having a structure wherein a foaming agent is encapsulated in a shell formed of a polymer, and more specifically to a thermally foamable microsphere having outstandingly improved processability and its production process.

BACKGROUND ART

Thermally foamable microspheres, also called thermally expansible microcapsules, are now put into practical use in various fields, for instance, in the form of fillers for paints or plastics added with a view to weight reduction purposes, to say nothing of foaming inks.

Thermally foamable microspheres have usually volatile liquid foaming agents microcapsulated with polymers. Such foaming agents are also called physical or volatile foaming agents. If desired, a chemical foaming agent that is decomposed upon heating to generate gases may often be used.

Generally, the thermally foamable microspheres may be produced by the suspension polymerization in an aqueous medium of a polymerizable mixture that at least contains a foaming agent and a polymerizable monomer. As the polymerization reaction goes on, a shell is formed by the resulting polymer, yielding a thermally foamable microsphere having a structure wherein the foaming agent is wrapped up and encapsulated in the shell.

For the polymer that forms the shell, thermoplastic resins having satisfactory gas barrier properties are generally used. The shell-forming polymer softens upon heated. The foaming agents used are selected from those that gasify at temperatures lower than the softening point of the polymer.

As the thermally foamable microsphere is heated, the foaming agent is vaporized to generate expanding force acting on the shell. At the same time, however, there is a drastic drop of the modulus of elasticity of the shell-forming polymer. For this reason, drastic expansion occurs at a certain critical temperature that is referred to as the foaming temperature. In other words, the thermally foamable microsphere expands by itself upon heated to the foaming temperature, forming a closed cell (cellular particle).

Taking advantage of the ability to form closed cells, thermally foamable microspheres have currently found a wide range of applications in the form of aesthetic improvers, functionality givers, weight reducers, etc. As the performance demanded for each application grows, the level demanded for the thermally foamable microspheres grows, too. Among the properties demanded for the thermally foamable microspheres, there is an improvement in processability.

For instance, there is a method for obtaining formed articles or sheets whose weight is reduced or whose aesthetic properties are improved by subjecting a composition comprising a thermoplastic resin blended with thermally foamable microspheres to kneading, calendering, extrusion or injection molding during which the thermally foamable microspheres are foamed.

As the thermally foamable microsphere undergoes volume expansion during foaming, however, the shell-forming polymer layer becomes thinner and thinner. In addition, the modulus of elasticity of the shell-forming polymer drops drastically under the influences of high processing temperature and high shear force with the result that the shell becomes soft and so the thermally foamable microsphere breaks down easily. It is thus very difficult to achieve the desired object.

Another problem with the thermally foamable microsphere is that the proper processing temperature range is very narrow because of an increased temperature dependency of the modulus of elasticity of the polymer that forms the shell.

Further, conventional thermally foamable microspheres are poor in resistance to polar solvents and plasticizers (solvent resistance and chemical resistance), and so have only limited applications in fields where, for instance, polar organic solvents are used.

JP-A 11-60868 discloses a soft vinyl chloride resin composition for foaming extrusion molding, in which thermally expansible microcapsules are blended with a plasticizer-containing vinyl chloride resin.

JP-A 2000-17103 discloses a resin composition production process comprising the first step of kneading at 100° C. or lower a resin composition comprising a thermoplastic resin having a melting or softening point of 100° C. or lower and a thermally expansible microcapsule that expands at 100 to 200° C., and the second step of kneading or molding the resultant resin composition with the addition of a thermoplastic resin thereto.

In order that thermally foamable microspheres are actually applicable to such foaming extrusion molding or kneading/molding, they must have a shell that has high foaming temperature and improved heat resistance. To add to this, the modulus of elasticity of the polymer that forms the shell must have a decreased dependency on temperature, a wide range of proper processing temperature, and improved resistance to polar solvents, plasticizers, etc.

To produce thermally foamable microspheres having high heat resistance, a process for forming a shell-forming polymer layer by the polymerization of a polymerizable monomer comprising a vinyl monomer with the addition of a crosslinkable monomer thereto has already been put forward (see JP-B's 42-26524 and 5-15499, patent No. 2894990 and JP-A 5-285376). By use of the crosslinkable monomer, it is thus possible to introduce a crosslinked structure into the shell-forming polymer, thereby making improvements in the heat resistance and melt flowability of thermally foamable microspheres.

As the degree of crosslinking of the polymer that forms the shell becomes high, however, the thermal expansibility of thermally foamable microspheres is impaired. For this reason, each of the examples in these prior arts merely shows that the crosslinking agent is used at a very low proportion of 1% by weight or less, and preferably 0.2 to 0.6% by weight of the polymerizable monomer.

At such a low proportion of the crosslinking agent it is impossible to obtain thermally foamable microspheres having sufficiently improved processability. Shells formed of conventional crosslinked polymers, too, are found to have a large dependency of their modulus of elasticity on temperature and, hence, have a very narrow range of proper processing temperature or be inferior in processability. Further, the shells formed of conventional crosslinked polymers are insufficient in terms of resistance to polar solvents and plasticizers.

Furthermore, the shells formed of conventional crosslinked polymers are actually limited to a polymer having a specific composition, and so it is difficult to design thermally foamable microspheres having improved compatibility with the thermoplastic resin used.

DISCLOSURE OF THE INVENTION

One object of the present invention is to provide a thermally foamable microsphere suitable for processing where strong shear force is applied thereto, for instance, kneading, calendering, extrusion, and injection molding, and its production process.

A particular object of the present invention is to provide a thermally foamable microsphere wherein a shell formed of a polymer has a limited dependency of its modulus of elasticity on temperature so that a wide range of proper processing temperature can be ensured, and its production process.

Another object of the present invention is to provide a thermally foamable microsphere that has resistance to polar solvents, plasticizers, etc. (chemical resistance and solvent resistance) and high capability of retaining foaming properties, and its production process.

As a result of intensive studies carried out so as to accomplish the foregoing objects, the present inventors have surprisingly found that it is possible to obtain a thermally foamable microsphere having outstandingly improved processability without being detrimental to thermal expansibility by forming the shell thereof using a polymer that is obtained by the polymerization of a polymerizable monomer and a crosslinkable monomer at a proportion of greater than 1% by weight up to 5% by weight based on the polymerizable monomer.

For the crosslinkable monomer, preference is given to bifunctional crosslinkable monomers, and particular preference is given to compounds having a structure wherein two polymerizalbe carbon-carbon double bonds are linked together via a flexible chain.

These findings have underlain the thus accomplished invention.

Thus, the present invention provides a thermally foamable microsphere having a structure wherein a foaming agent is encapsulated in a shell formed of a polymer, characterized in that:

(1) the shell formed of a polymer is formed of a polymer that is obtained by the polymerization of a polymerizable monomer and a crosslinkable monomer at a proportion of greater than 1% by weight up to 5% by weight based on the polymerizable monomer, and (2) a maximum expansion ratio of the thermally foamable microsphere is at least 5.

The present invention also provides a process for producing a thermally foamable microsphere having a structure wherein a foaming agent is encapsulated in a shell formed of a polymer that is obtained by subjecting a polymerizable mixture containing at least a foaming agent, a polymerizable monomer and a crosslinkable monomer to suspension polymerization in an aqueous dispersion medium, the process comprising subjecting the polymerizable mixture containing the crosslinkable monomer at a proportion of greater than 1% by weight up to 5% by weight based on the polymerizable monomer to suspension polymerization to obtain a thermally foamable microsphere having a maximum expansion ratio of at least 5.

BEST MODE FOR CARRYING OUT THE INVENTION

1. Thermally Foamable Microsphere Production Process

Figure 1:
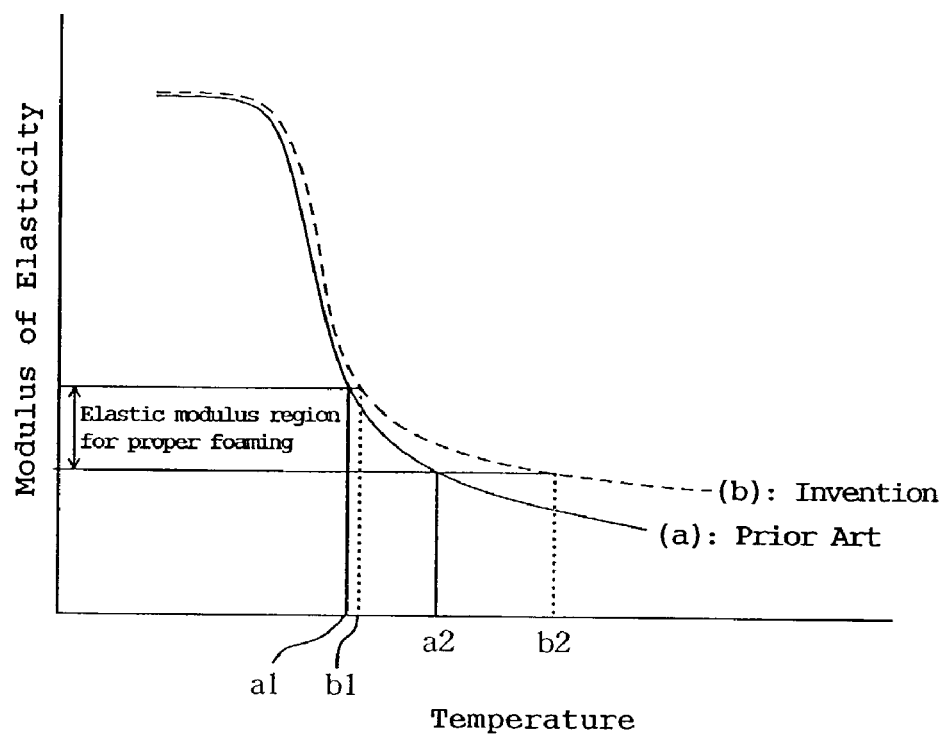
FIG. 1 is a graph showing relations between the modulus of elasticity of the shell polymer of a thermally foamable microsphere and temperature.

The thermally foamable microsphere of the present invention can be produced by the process for producing a thermally foamable microsphere having a structure in which a foaming agent is encapsulated in a shell formed of a polymer that is obtained by subjecting a polymerizable mixture containing at least a foaming agent, a polymerizable monomer and a crosslinkable monomer to suspension polymerization in an aqueous dispersion medium, the process comprising subjecting the polymerizable mixture containing the crosslinkable monomer at a proportion of greater than 1% by weight up to 5% by weight based on the polymerizable monomer to suspension polymerization.

By adjusting the types and proportions of the polymerizable monomer and crosslinking agent used, it is possible to obtain thermally foamable microspheres having a maximum expansion ratio of at least 5, and preferably at least 10. The "maximum expansion ratio" used in this invention is understood to refer to a maximum expansion ratio at a foaming temperature at which the thermally foamable microsphere shows the maximum expansion ratio. How to measure this maximum expansion ratio will be explained later.

(1) Foaming Agent

The foaming agent used herein is usually a substance that gasifies at a temperature lower than the softening point of the shell-forming polymer.

Preferable for such foaming agents are low-boiling organic solvents exemplified by low-molecular-weight hydrocarbons such as ethane, ethylene, propane, propene, n-butane, isobutane, butene, isobutene, n-pentane, isopentane, neopentane, n-hexane, isohexane, heptane and petroleum ether; chlorofluorocarbons such as $CCl_3F$; and tetraalkylsilanes such as tetramethylsilane.

These foaming agents may be used alone or in combination of two or more, and preferable among them are isobutane, n-butane, n-pentane, isopentane, n-hexane, isohexane and petroleum ether, which may be used in admixture of two or more. If desired, it is acceptable to make use of a compound that is thermally decomposed by heating into a gaseous state.

(2) Polymerizable Monomer, and Polymer

The polymerizable monomer used herein is exemplified by acrylic esters such as methyl acrylate, ethyl acrylate, butyl acrylate and dicyclopentenyl acrylate; methacrylic esters such as methyl methacrylate, ethyl methacrylate, butyl methacrylate and isobornyl methacrylate; and vinyl monomers such as acrylonitrile, methacrylonitrile, vinylidene chloride, vinyl chloride, styrene, vinyl acetate, α-methylstyrene, chloroprene, neoprene and butadiene. These polymerizable monomers may be used singly or in combination of two or more.

Preferably in the thermally foamable microsphere, the polymer that forms the shell should be thermoplastic and have gas barrier properties. In consideration of these, vinylidene chloride (co)polymers and (meth) acrylonitrile (co)polymers are preferred for the shell-forming polymer.

The vinylidene chloride (co)polymers are exemplified by (co)polymers that are obtained using as a polymerizable monomer vinylidene chloride alone or a mixture of vinylidene chloride and a vinyl monomer copolymerizable therewith. The monomer copolymerizable with vinylidene chloride, for instance, includes acrylonitrile, meth-acrylonitrile, methacrylic ester, acrylic ester, styrene and vinyl acetate.

Preferable for one vinylidene chloride (co)polymer are copolymers that are obtained using as polymerizable monomers (A) 30 to 100% by weight of vinylidene chloride and (B) 0 to 70% by weight of at least one monomer selected from the group consisting of acrylonitrile, methacrylonitrie, acrylic ester, methacrylic ester, styrene and vinyl acetate. It is not preferable that the proportion of vinylidene chloride copolymerized is below 30% by weight, because the gas barrier properties of the shell become too low.

Preferable for another vinylidene chloride (co)polymer are copolymers that are obtained by using as polymerizable monomers (A1) 40 to 80% by weight of vinylidene chloride, (B1) 0 to 60% by weight of at least one monomer selected from the group consisting acrylonitrile and methacrylonitrile and (B2) 0 to 60% by weight of at least one monomer selected from the group consisting of acrylic ester and methacrylic ester. Such copolymers make the design of foaming temperature easy and enable high expansion ratios to be easily achievable.

Where solvent resistance and high-temperture foaming capability are desired, it is preferable that the shell is formed of a (meth)acrylonitrile (co)polymer. The (meth) acrylonitrile (co)polymer, for instance, includes copolymers that are obtained using as polymerizable monomers (meth)acrylonitrile alone or meth(acrylonitrile) and a vinyl monomer copolymerizable therewith. The vinyl monomer copolymerizable with the (meth) acrylonitrile, for instance, includes vinylidene chloride, acrylic ester, methacrylic ester, styrene and vinyl acetate.

Preferable for such (meth)acrylonitrile (co)polymer are copolymers that are obtained using as polymerizable monomers (C) 30 to 100% by weight of at least one monomer selected from the group consisting of acrylonitrile and methacrylonitrile and (D) 0 to 70% by weight of at least one monomer selected from the group consisting of vinylidene chloride, acrylic ester, methacrylic ester, styrene and vinyl acetate. When the proportion of the (meth)acrylonitrile copolymerized is less than 30% by weight, solvent resistance and heat resistance become insufficient.

The (meth)acrylonitrile (co)polymer may be broken down into a (co)polymer that has a high (meth) acrylonitrile proportion and a high foaming temperature, and a (co)polymer that has a low (meth)acrylonitrile proportion and a low foaming temperature. The (co)polymer having a high (meth)acrylonitrile proportion, for instance, includes a (co)polymer that is obtained using as polymerizable monomers (C) 80 to 100% by weight of at least one monomer selected from the group consisting of acrylonitrile and methacrylonitrile and (D) 0 to 20% by weight of at least one monomer selected from the group consisting of vinylidene chloride, acrylic ester, methacrylic ester, styrene and vinyl acetate.

On the other hand, the (co)polymer having a low (meth) acrylonitrile proportion, for instance, includes a copolymer that is obtained using as polymerizable monomers (C) more than 30% by weight to less than 80% by weight of at least one monomer selected from the group consisting of acrylonitrile and methacrylonitrile and (D) greater than 20% by weight up to 70% by weight of at least one monomer selected from the group consisting of vinylidene chloride, acrylic ester, methacrylic ester, styrene and vinyl acetate.

Also preferable for the (meth)acrylonitrile (co)polymer is a copolymer that is obtained using as polymerizable monomers (C1) 51 to 100% by weight of at least one monomer selected from the group consisting of acrylonitrile and methacrylonitrile, (D1) 0 to 40% by weight of vinylidene chloride and (D2) 0 to 48% by weight of at least one monomer selected from the group consisting of acrylic ester and methacrylic ester.

Where a vinylidene chloride-free (co)polymer is desired for the shell polymer, preference is given to (meth)acrylonitrile (co)polymers that are obtained using polymerizable monomers (E) 30 to 100% by weight of at least one monomer selected from the group consisting of acrylonitrile and methacrylonitrile and (F) 0 to 70% by weight of at least one monomer selected from the group consisting of acrylic ester and methacrylic ester.

Preference is also given to a copolymer that is obtained using as polymerizable monomers (E1) 1 to 99% by weight of acrylonitrile, (E2) 1 to 99% by weight of methacrylonitrile and 0 to 70% by weight of at least one monomer selected from the group consisting of acrylic ester and methacrylic ester.

Where it is desired to obtain a thermally foamable microsphere that is particularly improved in terms of processability, foaming capability, gas barrier properties, solvent resistance, etc., it is preferable to use for the shell a (meth) acrylonitrile (co)polymer that is obtained using as polymerizable monomers (E1) 20 to 80% by weight of acrylonitrile, (E2) 20 to 80% by weight of methacrylonitrile and (F) 0 to 20% by weight of at least one monomer selected from the group consisting of acrylic ester and methacrylic ester.

(3) Crosslinkable Monomer

In the present invention, a crosslinkable monomer is used together with such a polymerizable monomer as mentioned above for the purpose of making improvements in processability, foaming properties, heat resistance, solvent resistance (chemical resistance), etc.

For the crosslinkable monomer, usually, polyfunctional compounds having two or more polymerizable carbon-carbon double bonds are used. For the polymerizable carbon-carbon double bonds, vinyl, methacryl, acryl, allyl or other groups are mentioned. Two or more polymerizable carbon-carbon bonds may be the same as or different from one another.

Exemplary crosslinkable monomers are aromatic divinyl compounds such as divinylbenzene, divinyl-napthalene or their derivatives; diethylenical unsaturated carboxylic esters such as ethylene glycol di(meth)acrylate and diethylene glycol di(meth)acrylate; (meth)acrylates derived from aliphatic both-terminated alcohols such as 1,4-butanediol and 1,9-nonanediol; divinyl compounds such as N,N-divinylaniline and divinyl ethers; and other bifunctional crosslinkable monomers.

For the crosslinkable monomer, use may also be made of tri- or poly-functional crosslinkable monomers such as trimethylolpropane tri(meth)acrylate, pentaerythritol tri(meth) accrylate and triacrylformal.

Among the crosslinkable monomers, preference is given to bifunctional crosslinkable monomers having two polymerizable carbon-carbon double bonds because it is easy to reconcile foaming capability with processability. When used at an increased proportion, tri- or poly-functional crosslinkable monomers give rise to a shell-forming polymer that is often unsusceptible to foaming even upon heated because of a loss of thermoplastic resin properties.

Preferable for the bifunctional crosslinkable monomer is a compound having a structure wherein two polymerizable carbon-carbon double bonds are linked together directly or indirectly via a flexible chain derived from a diol compound selected from the group consisting of polyethylene glycol, polypropylene glycol, an alkyldiol, an alkyl ether diol and an alkyl ester diol.

When the bifunctional crosslinkable monomer having such a flexible chain is used as the crosslinkable monomer at a proportion of greater than 1% by weight up to 5% by weight, it is then possible to reduce the dependency of the modulus of elasticity of the shell polymer on temperature while the expansion ratio is kept high. It is thus possible to obtain a thermally foamable microsphere that is less susceptible to a shell rupture or dissipation of included gases even upon receipt of shear force at processing steps such as kneading, calendering, extrusion, and injection molding steps.

When the bifunctional crosslinkable monomer having a flexible chain is used at a specified proportion, it is presumed that "strain-curing" physical properties could be imparted to the shell polymer layer of the thermally foamable microsphere. The wording "strain-curability" is understood to means the ability that as the amount of deformation increases, larger deforming stress is needed for the application of additional deformation.

As the thermally foamable microsphere of the present invention is foamed by heating, the shell polymer layer is elongated with the start and progress of foaming. When, at that time, the shell polymer has a suitable degree of strain curability, not only a thin portion of the polymer layer is elongated by deforming stress, but a thick portion of the polymer layer that is less deformed and so requires small deforming stress is preferentially elongated. This ensures that even when the degree of crosslinking of the shell polymer layer is high, high expansion ratios are achievable. In addition, because the shell polymer layer has a uniform thickness, its resistance to temperature, shear force and solvents becomes strong.

On the other hand, when the site where the polymerizable carbon-carbon double bonds are linked together has a rigid structure or the amount of the crosslinkable monomer used is too much, the strain curability becomes too strong, resulting in large expansion ratio decreases or, in the worst case, no foaming at all.

The bifunctional crosslinkable monomer having a structure wherein two polymerizable carbon-carbon double bonds are linked together via the aforesaid flexible chain, for instance, includes polyethylene glycol di(meth)acrylate, polypropylene glycol di(meth)acrylate, an alkyldiol di(meth)acrylate, an alkyl ether diol di(meth)acrylate and an alkyl ester diol di(meth)acrylate as well as mixtures of two or more thereof.

More exemplary bifunctional crosslinkable monomers include polyethylene glycol di(meth)acrylates (usually containing 2 to 15 ethylene oxide units ($-CH_2CH_2O-$)) such as diethylene glycol di(meth)acrylate, triethylene glycol di(meth)acrylate and tetraethylene glycol di(meth) acrylate; polypropylene glycol di(meth)acrylates (usually containing 2 to 20 propylene oxide units ($-CH(CH_3)CH_2O-$) or ($-CH_2CH(CH_3)O-$)) such as dipropylene glycol di(meth) acrylate, tripropylene glycol di(meth)acrylate and tetrapropylene glycol di(meth)acrylate; alkyldiol di(meth)acrylates (wherein the flexible chain comprises aliphatic carbons with the linkage having usually 2 to 20 carbon atoms) such as ethylene glycol di(meth)acrylate, propylene glycol di(meth) acrylate, 1,3-propanediol di(meth)acrylate, 1,4-butanediol di(meth)acrylate, 1,3-butylenediol di(meth)acrylate, 1,6-hexanediol di(meth)acrylate, 1,9-nonanediol di(meth)acrylate, neopentyl glycol di(meth)acrylate, 3-methyl-1,5-pentanediol di(meth)acrylate, 2,4-diethyl-1,5-pentanediol di(meth)acrylate and 2-hydroxy-1,3-propanediol di(meth) acrylate; alkyl ether diol di(meth)acrylates (represented by the formula ($-R_1-O-R_2-$) wherein the flexible chain is constructed of aliphatic carbons $R_1$, $R_2$ and an ether bond; when there is one ether bond, the aliphatic carbons in ($-R_1-O-R_2-$) are usually different from each other, i.e., $R_1 \neq R_2$) such as 3-oxa-1,6-hexanediol di(meth)acrylate; and alkyl ester diol di(meth)acrylates (represented by the formula ($-R_1-COO-R_2-$) where the flexible chain is composed of aliphatic carbons $R_1$, $R_2$ and an ester bond) such as hydroxypivalic acid neopentyl glycol di(meth)acrylate.

The lower limit to the proportion of the crosslinkable monomer used is greater than 1% by weight, preferably 1.1% by weight, more preferably 1.2% by weight, and even more preferably 1.3% by weight based on the polymerizable monomer (polymerizable polymer=100% by weight), and the upper limit thereto is 5% by weight, preferably 4% by weight, and more preferably 3% by weight on the same basis.

Especially with the bifunctional polymerizable monomer having a structure wherein two polymerizable carbon-carbon double bonds are linked together via the aforesaid flexible chain, satisfactory results are often easily obtainable when the proportion of the crosslinkable monomer used is in the range of 1.4 to 4% by weight, and preferably 1.5 to 3% by weight.

When the proportion of the crosslinkable monomer used is equal to or less than 1% by weight, only processability similar to that of conventional thermally foamable microspheres is obtainable. When the proportion of the crosslinking agent used is in excess, on the other hand, foaming is hard to occur because the shell polymer loses thermoplasticity.

(4) Polymerization Initiator

For the polymerization initiator that is not particularly critical to the present invention, use may be made of those generally available in this field; however, it is preferable to use an oil-soluble polymerization initiator that is soluble in the polymerizable monomer.

Exemplary polymerization initiators are dialkyl peroxides, diacyl peroxides, peroxy esters, peroxy-dicarbonates and azo compounds.

Usually, the polymerization initiator is contained in the monomer mixture. However, when it is required to prevent any premature polymerization, a part or the whole of the polymerization initiator may be added to an aqueous dispersion medium during or after particle formation, thereby passing it into droplets of the polymerization mixture. The polymerization initiator is usually used at a proportion of 0.0001 to 3% by weight on an aqueous dispersing medium basis.

(5) Aqueous Dispersion Medium

Usually, suspension polymerization is carried out in an aqueous dispersion medium containing a dispersion stabilizer that is exemplified by silica, magnesium hydroxide and other inorganic fine particles. Besides, co-stabilizers such as condensation products of diethanolamine and aliphatic dicarboxylic acids, polyvinyl pyrrolidone, polyethylene oxide and various emulsifiers may be used. The dispersion stabilizer is usually used at a proportion of 0.1 to 20 parts by weight per 100 parts by weight of the polymerizable monomer.

The dispersion stabilizer-containing aqueous dispersion medium is usually prepared by incorporating the dispersion stabilizer or co-stabilizer in deionized water. The pH of an aqueous phase upon polymerization is properly determined depending on the type of the dispersion stabilizer or co-stabilizer used. For instance, when silica like colloidal silica is used as the dispersion stabilizer, the polymerization is carried out in an acidic environment. To acidify the aqueous dispersion medium, an acid is added to the system if required, thereby regulating the pH of the system to 6 or lower, and preferably about 3 to 4. With a dispersion stabilizer such as magnesium hydroxide or calcium phosphate that dissolves in the aqueous dispersion medium in an acidic environment, the polymerization is carried out an alkaline environment.

One preferable dispersion stabilizer combination consists of colloidal silica and a condensation product preferably exemplified by that of diethanolamine and an aliphatic dicarboxylic acid, especially that of diethanolamine and adipic acid or diethanolamine and itaconic acid. The condensation product has an acid number in the range of preferably 60 to less than 95, and more preferably 65 to 90.

It is here noted that the addition of an inorganic salt such as sodium chloride or sodium sulfate to the aqueous dispersion medium makes it easy to obtain thermally foamable microspheres having more uniform particle shape. For the inorganic salt, usually, common salt is preferred.

The amount of colloidal silica used is usually in the range of 1 to 20 parts by weight, and preferably 2 to 15 parts by weight per 100 parts by weight of the polymerizable monomer although varying with its particle diameter.

The condensation product is usually used at a proportion of 0.05 to 2 parts by weight per 100 parts by weight of the polymerizable monomer.

The inorganic salt is ordinarily used at a proportion of 0 to 100 parts by weight per 100 parts by weight of the polymerizable monomer.

Other preferable dispersion stabilizer combinations consist of colloidal silica and water-soluble nitrogenous compounds. Among these, a colloidal silica and polyvinyl pyrrolidone combination is preferred. Combinations of magnesium hydroxide and/or calcium phosphate with emulsifiers are also preferred.

For the dispersion stabilizer, colloids of slightly water-soluble metal hydroxides (e.g., magnesium hydroxide) may be used, which hydroxides are obtained by reactions in aqueous phases of water-soluble polyvalent metal chlorides (e.g., magnesium chloride) and alkaline metal hydroxides (e.g., sodium hydroxide). For the calcium phosphate, products of reactions in aqueous phases of sodium phosphate and calcium chloride may be used.

The emulsifiers are not generally used; if desired, however, it is acceptable to use anionic surfactants such as salts of dialkyl sulfosuccinic acid or phosphoric esters of polyoxyethylene alkyl (allyl) ethers.

At least one compound selected from the group consisting of alkaline metal nitrites, stannous chloride, stannic chloride, water-soluble ascorbic acids and boric acid may be present as a polymerization aid in the aqueous dispersion medium. Suspension polymerization in the presence of these compounds causes no aggregation of polymer particles during polymerization, and prevents the polymer product from depositing onto the wall of a polymerization vessel, so that thermally foamable micro-spheres can be produced stably while heat generated due to polymerization can be effectively removed.

Among the alkaline metal nitrites, sodium nitrite and potassium nitrite are preferred in view of availability and price. The ascorbic acids, for instance, include ascorbic acid, metal salts of ascorbic acid and esters of ascorbic acid, among which water-soluble ones are preferred.

The "water-soluble ascorbic acids" are here understood to refer to those having a solubility of at least 1 g/100 cm$^3$ in water of 23° C., for which ascorbic acid and its alkaline metal salts are preferred. Among these, L-ascorbic acid (vitamin C), sodium ascorbate and potassium ascorbate are particularly preferred in view of availability and price, and action and effect as well.

These polymerization aids are used at a proportion of usually 0.001 to 1 part by weight, and preferably 0.01 to 0.1 part by weight per 100 parts by weight of the polymerizable monomer.

(6) Suspension Polymerization

In what order the respective components are added to the aqueous dispersion medium is not critical to the present invention. Usually, however, it is preferable that the dispersion stabilizer-containing aqueous dispersion medium is prepared by adding water and the dispersion stabilizer to the aqueous dispersion medium, optionally with the addition thereto of the co-stabilizer and polymerization aid. On the other hand, the foaming agent, polymerizable monomer and crosslinkable monomer may be added separately to the aqueous dispersion medium whereupon they are integrated together into a polymerizable mixture (an oily mixture) in the aqueous dispersion medium. However, usually, such components are pre-mixed together and the resulting mixture is then added to the aqueous dispersion medium.

The polymerization initiator may be used while previously added to the polymerization monomer. When prevention of any premature polymerization is in need, for instance, it is acceptable to add the polymerizable mixture to the aqueous dispersion medium and then adding the polymerization initiator under agitation, thereby integrating them together in the aqueous dispersion medium. Alternatively, the polymerizable mixture may be mixed with the aqueous dispersion medium in a separate vessel. Then, the mixture is mixed under agitation in a stirring or dispersing machine with high shear force, followed by feeding in a polymerization vessel.

By mixing under agitation of the polymerizable mixture with the aqueous dispersion medium, droplets of the polymerizable mixture are formed in the aqueous dispersion medium. The average particle diameter of the droplets should preferably be substantially in agreement with the desired particle diameter of thermally foamable microspheres, and usually on the order of 3 to 100 μm.

To obtain thermally foamable microspheres having a very sharp particle diameter distribution, it is preferable to rely upon a process in which the aqueous dispersion medium and polymerizable mixture are fed into a continuous high-speed rotation, high-shear type stirring/dispersing machine wherein both are continuously stirred and dispersed, and the obtained dispersion is thereafter poured into a polymerization vessel wherein the dispersion is suspension polymerized.

More specifically, at the step of feeding the aqueous dispersion medium and polymerizable mixture into the continuous high-speed rotation, high-shear type stirring/dispersing machine, two methods are available, one method (i) wherein the aqueous dispersion medium and the polymerizable mixture are each fed as a separate stream at a constant ratio continuously into the continuous high-speed rotation, high-shear type stirring/dispersing machine, and another (ii) wherein the aqueous dispersion medium and polymerizable mixture are poured together in a dispersing tank wherein both are stirred together for primary dispersion, and the obtained primary dispersion is then fed into a continuous high-speed rotation, high-shear type stirring/dispersing machine.

Figure 2:
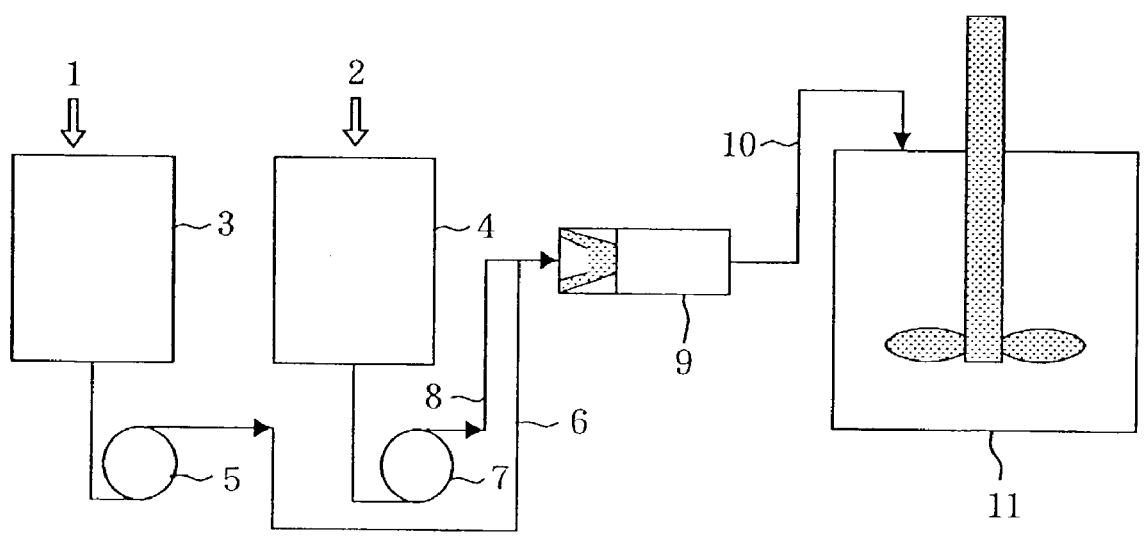
FIG. 2 is illustrative of one embodiment of the thermally foamable microsphere production process using a continuous high-speed rotation, high-shear type dispersing machine.

According to the aforesaid method (i), at the step of feeding the aqueous dispersion medium and polymerizable mixture into the continuous high-speed rotation, high-shear type stirring/dispersing machine, an aqueous dispersion medium 1 and a polymerizable mixture 2 are each fed as a separate stream at a constant ratio continuously into the continuous high-speed rotation, high-shear type stirring/dispersing machine, as typically shown in FIG. 2.

To be more specific, the aqueous dispersion medium 1 is stored in a storage tank 3 and the polymerizable mixture 2 in a storage tank 4, respectively. The aqueous dispersion medium 1 is fed as one stream from a line 6 using a pump 5, and the polymerizable mixture 2 is fed as another stream from a line 8 using a pump 7, into a continuous high-speed rotation, high-shear type stirring/dispersing machine 9. The feed ratio between the aqueous dispersion medium 1 and the polymerizable mixture 2 is in the range of usually 1:1 to 6:1, and preferably 2:1 to 4:1. After both are continuously stirred and dispersed together in the stirring/dispersing machine 9, the resulting dispersion is poured through a line 10 into a polymerization vessel 11, wherein the dispersion is suspension polymerized.

Figure 3:
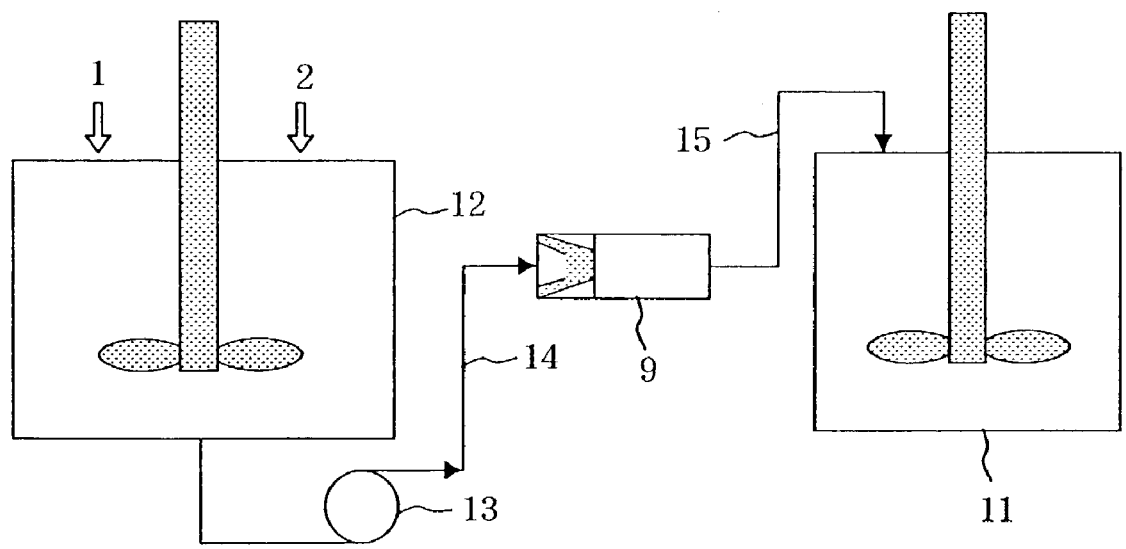
FIG. 3 is illustrative of another embodiment of the thermally foamable microsphere production process using a continuous high-speed rotation, high-shear type dispersing machine.

According to the aforesaid method (ii), at the step of feeding the aqueous dispersion medium and polymerizable mixture into the continuous high-speed rotation, high-shear type stirring/dispersing machine, an aqueous dispersion medium 1 and a polymerizable mixture 2 are poured into a dispersing tank 12, wherein both are stirred together for primary dispersion, as typically shown in FIG. 3.

In the dispersing tank 12, there is usually provided a general stirring blade. The ratio between the aqueous dispersion medium 1 and the polymerizable mixture 2 is in the range of usually 1:1 to 6:1, and preferably 2:1 to 4:1. The primary dispersion obtained by stirring in the dispersing tank is then fed through a line 14 into a continuous high-speed rotation, high-shear type stirring/dispersing machine 9, using a pump 13. After the primary dispersion is further stirred and dispersed in the stirring/dispersing machine 9, the resulting dispersion is poured through a line 15 into a polymerization vessel 11, wherein the dispersion is suspension polymerized. According to the aforesaid method (ii), it is possible to obtain thermally foamable microspheres having a sharp particle diameter distribution in a stable manner.

With such methods it is possible to obtain thermally foamable microspheres having an average particle diameter of 3 to 100 μm and a sharp particle diameter distribution as expressed in terms of the coefficient of particle diameter distribution variation of preferably up to 1.50%, more preferably up to 1.30%, and even more preferably up to 1.10%. Thermally foamable microspheres having a sharp particle diameter distribution are capable of foaming so sharply that uniform foams or molded foams can be obtained.

Figure 4:
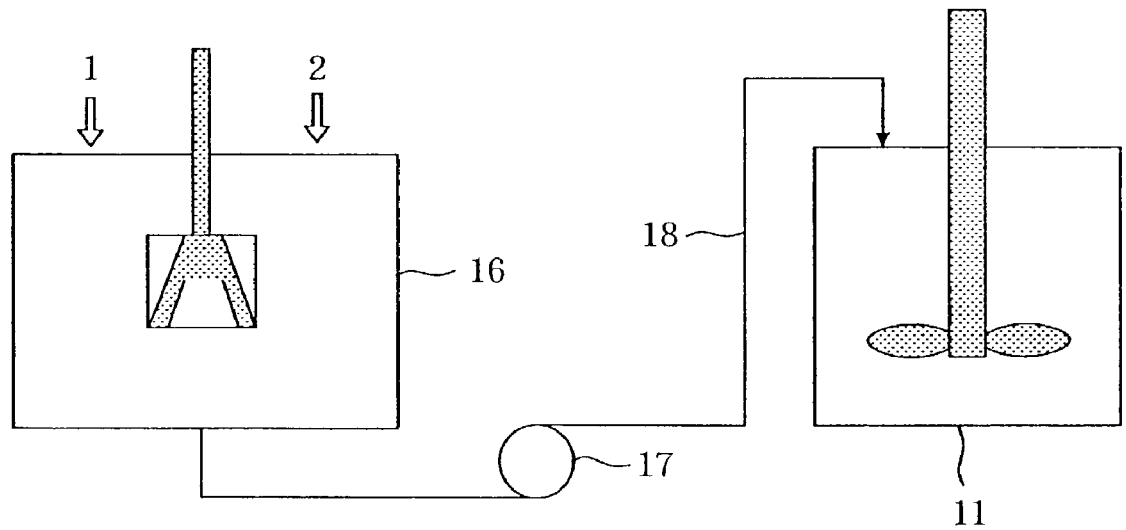
FIG. 4 is illustrative of yet another embodiment of the thermally foamable microsphere production process using a batch-wise high-speed, high-shear type dispersing machine.

Alternatively in the present invention, it is acceptable to use such a batch-wise high-speed rotation, high shear type dispersing machine as shown in FIG. 4. In one typical method using such a batch-wise high-speed rotation, high-shear type dispersing machine, an aqueous dispersion medium 1 and a polymerizable mixture 2 are charged into a batch-wise high-speed rotation, high-shear type dispersing machine 16 wherein they are stirred and dispersed thereby forming minute droplets of the polymerizable mixture. Then, the dispersion is poured through a line 18 into a polymerization vessel 11 using a pump 17, wherein the dispersion is suspension polymerized.

Usually, suspension polymerization is carried out at an elevated temperature of 30 to 100° C. while a reaction vessel is degassed or replaced therein by an inert gas. After the suspension polymerization, an aqueous phase is removed by filtration, centrifugation, sedimentation, etc. After filtration and washing, the thermally foamable microspheres are collected in a wet cake state. If required, the thermally foamable microspheres are dried at a temperature relatively low enough to prevent gasification of the foaming agent.

If desired, the thermally foamable microspheres may be treated on their surfaces with various compounds or, alternatively, they may be deposited thereon with inorganic fine powders. Still alternatively, the thermally foamable microspheres may be coated on their surfaces with various materials other than the inorganic fine powders.

2. Thermally Foamable Microspheres

The thermally foamable microsphere of the present invention has a structure wherein the foaming agent is encapsulated in the shell formed of a polymer. A shell polymer is formed by the polymerization of a polymerizable monomer (usually a vinyl monomer). In the present invention, however, the shell polymer is formed by the polymerization of a polymerizable monomer and a cross-linkable monomer at a proportion of greater than 1% by weight up to 5% by weight based on the polymerizable monomer.

In the thermally foamable microsphere of the present invention, the shell polymer is formed using the polymerizable monomer together with a relatively large amount of the crosslinkable monomer preferably exemplified by a bifunctional crosslinkable monomer, and so has a reduced dependency of its modulus of elasticity on temperature. Accordingly, when a resin composition obtained by blending the thermally foamable microspheres of the invention with a thermoplastic resin as an example is processed by kneading, calendering, extrusion, injection molding or the like, shell ruptures or dissipation of included gases are less likely.

The thermally foamable microsphere of the present invention, because the shell polymer has a reduced dependency of its modulus of elasticity on temperature, enables the temperature well suited for uniform-foaming processing to be chosen from a far wider range, as will be explained with reference to FIG. 1.

FIG. 1 is a graph showing the shell's modulus of elasticity vs. temperature relations. The modulus elasticity of the shell polymer (a) of a conventional thermally foamable microsphere drops steeply with increasing temperature; the temperature range (a2–a1) allowed for the elastic modulus region where proper (uniform) foaming takes place is narrow.

In contrast to this, the modulus of elasticity of the shell polymer (b) of the thermally foamable microsphere of the present invention drops gently with increasing temperature; the temperature range (b2–b1) allowed for the elastic modulus region where uniform foaming occurs is so wide that the temperature well suited for uniform-foaming processing can be chosen from a far wider range.

Although not particularly critical, the thermally foamable microsphere of the present invention has an average particle diameter in the range of usually 3 to 100 μm, and preferably 5 to 50 μm. It is here noted that too small an average particle diameter causes foaming capability to become insufficient, and too large an average particle diameter is not preferable especially in applications where attractive appearances are needed, because of coarsening surfaces, and because resistance to shear force, too, becomes less than satisfactory.

The coefficient of particle diameter distribution variation of the thermally foamable microsphere according to the present invention is, but is not limited to, preferably 1.50% or lower in applications where particularly sharp foaming is required. The coefficient of particle diameter distribution variation is more preferably 1.30% or lower, and even more preferably 1.10% or lower.

Coexistence of thermally foamable microspheres having large and small particle diameters causes an increase in the coefficient of particle diameter distribution variation. Thermally foamable microspheres having a large particle diameter are more likely to become low in the foaming start temperature than those having a small particle diameter. To achieve uniform foaming while premature foaming is warded off, it is desired that the coefficient of variation of thermally foamable micro-spheres be kept small. Thermally foamable microspheres having an extremely reduced coefficient of particle diameter distribution variation, for instance, may be obtained by the aforesaid methods (i) and (ii).

The "coefficient of particle diameter distribution variation" used herein is understood to refer to a value calculated from the following equations (1) and (2):

$$C_v = \left\{ \sqrt{\frac{1}{100} \sum_{j=1}^{n} q_j \left( \frac{\log x_j + \log x_{j+1}}{2} \right)^2 - \mu^2} \middle/ \mu \right\} \times 100 \quad (1)$$

$$\mu = \frac{1}{100} \sum_{j=1}^{n} q_j \left( \frac{\log x_j + \log x_{j+1}}{2} \right) \quad (2)$$

Here $\mu$ is an average value, $x_j$ is a particle diameter, and $q_j$ is a frequency distribution.

The content of the foaming agent in the thermally foamable microsphere of the present invention is in the range of usually 5 to 50% by weight, and preferably 7 to 35% by weight on a total weight basis. Too low a foaming agent content causes the expansion ratio to become insufficient whereas too much causes the shell to become thin, and so makes premature foaming or shell ruptures likely to occur by shear force upon heated for processing.

For the foaming agent used herein, use may be made of low-boiling organic solvents, and compounds that are decomposed by heating to generate gases. Among these, the low-boiling organic solvents are preferred. The foaming agent used is selected from compounds that gasify at temperatures lower than the softening point of the shell-forming polymer.

Usually, the shell of the thermally foamable micro-sphere of the present invention is formed of a polymer that has improved gas barrier properties and heat resistance. To be specific, the shell may be formed using a variety of polymerizable monomers, e.g., acrylic ester, (meth)acrylonitrile, vinylidene chloride, vinyl chloride and styrene as already mentioned above. Preferred among these are vinylidene chloride (co)polymers and (meth)acrylonitrile (co)polymers because high degrees of tradeoffs can be made between gas barrier properties, solvent resistance, heat resistance and foaming capability. According to the present invention, thermally foamable microspheres exhibiting a variety of foaming behaviors may be obtained by control of combinations and composition ratios of the polymerizable monomers used and selection of the type of the foaming agent used.

The thermally foamable microspheres of the present invention are particularly improved in terms of processability, with foaming properties (thermal expansibility) well balanced with processability. The thermally foamable microspheres of the present invention, albeit using the crosslinking agent at a proportion of greater than 1% by weight, keep thermal expansibility intact or have a maximum expansion ratio of 5 or greater. The maximum expansion ratio is in the range of preferably 10 or greater, and more preferably 20 or greater, and in most cases, it is possible to achieve a maximum expansion ratio of 30 to 60.

In the thermally foamable microsphere of the present invention, the modulus of elasticity of the shell formed of the polymer is less dependent on temperature. The thermally foamable microsphere of the present invention ensures a wide temperature range well suited for processing. The thermally foamable microsphere of the present invention has high capabilities of ensuring resistance (chemical resistance and solvent resistance) to polar solvents, plasticizers, etc. and having foaming properties. These properties that the thermally foamable microsphere of the present invention possesses are specifically shown in the examples given later.

Among exemplary properties that the thermally foamable microsphere of the present invention has, there is a limited dependency of foaming on temperature. For instance, when the shell polymer of the thermally foamable microsphere of the present invention is a vinylidene chloride (co)polymer as already mentioned, the ratio of the maximum expansion ratio $R_1$ to the expansion ratio $R_2$ at a temperature 10° C. higher than the temperature at which $R_1$ is obtained, $R_2/R_1$, is in the range of usually 0.8 to 0.4, preferably 0.9 to 0.5, and more preferably 1 to 0.5.

When the shell polymer of the thermally foamable microsphere of the present invention is a (meth) acrylonitrile copolymer (wherein the proportion of (meth) acrylonitrile copolymerized is equal to or greater than 30% by weight to less 80% by weight) as already mentioned, the ratio of the maximum expansion ratio $R_1$ to the expansion ratio $R_2$ at a temperature 5° C. higher than the temperature at which $R_1$ is obtained, $R_2/R_1$, is in the range of usually 1 to 0.8, preferably 1 to 0.85, and more preferably 1 to 0.9.

When the shell polymer of the thermally foamable microsphere of the present invention is a (meth)acrylonitrile (co)polymer (wherein the proportion of (meth) acrylonitrile is 80 to 100% by weight), in particular, the aforesaid bifunctional crosslinkable monomer having a flexible chain can be used as the crosslinkable monomer at a proportion of greater than 1% by weight to 5% by weight, thereby obtaining a thermally foamable microsphere that has improved processability and chemical resistance with a high degree of foaming capability maintained, while the dependency of the shell's modulus of elasticity on temperature is reduced.

3. Application Field

The thermally foamable micro spheres of the present invention may find various applications while they are foamed by heating (thermally expanded) or they remain unfoamed.

Taking advantage of expansibility, for instance, the thermally foamable microspheres of the present invention may be used as fillers for paints for automobiles, wallpapers, foaming agents for foaming inks (for applying relief patterns to T-shirts, etc.), shrink preventives or the like.

Making good use of volume increases by foaming, the thermally foamable microspheres of the present invention may also be used for the purposes of reducing the weights of plastics, paints, various materials, etc., or making them porous or imparting various functions (e.g., slip properties, heat insulation, cushioning properties, and sound insulation) to them.

The thermally foamable microspheres of the present invention may have additional applications in paint, wallpaper and ink fields wherein surface properties and smoothness are required. The thermally foamable micro-spheres of the present invention, because of having improved processability, may be suitably applied to fields where processing steps such as kneading, calendering, extrusion, and injection molding steps are required.

EXAMPLES

The present invention is now explained more specifically with reference to inventive, and comparative examples. How to measure physical properties and various properties is first given below.

(1) Expansion Ratio and Maximum Expansion Ratio

Thermally foamable microspheres (0.7 gram) were placed in a Geer oven wherein they were heated at a given temperature (foaming temperature) for 2 minutes for foaming. The obtained foams were placed in a graduated cylinder to measure their volume, which was then divided by the volume of the unfoamed microspheres to find an expansion ratio. In this case, the expansion ratio was measured while the foams were heated from 100° C. at an increment of 5° C. to find a foaming temperature at which the highest expansion ratio was obtained. This highest expansion ratio is herein defined as the maximum expansion ratio.

(2) Average Particle Diameter

Using a particle diameter distribution meter SALD-3000J made by Shimadzu Corporation, the median diameter of microspheres was measured on a weight basis. This median diameter is herein defined as the average particle diameter.

(3) Modulus of Elasticity

Thermally foamable microspheres were foamed. After as much foaming agent as possible was removed, the foams were hot pressed on a hot press into a sheet, out of which a test piece of 1 cm×1.5 cm×0.25 cm was cut. Using Rheograph Solid made by Toyo Seiki Seisakusho, the test piece was heated at a frequency of 10 Hz and a heating rate of 3° C./minute in a nitrogen atmosphere to measure the modulus of elasticity.

(4) Expansion Ratio in Binder System

Provided is an ethylene-vinyl acetate copolymer emulsion (having a concentration of 55% by weight) containing an ethylene-vinyl acetate copolymer (EVA; ethylene/vinyl acetate=30/70% by weight). Then, thermally foamable microspheres are added to the emulsion at a proportion of 1 part by weight per 5 parts by weight of EVA to prepare a coating solution. This coating solution is applied on double-coated paper by means of a coater with a 200 μm gap, which paper is dried, and then loaded in an oven of given temperature, wherein it is heated for 2 minutes. The expansion ratio is herein defined by the thickness ratio before and after foaming.

(5) Chemical Resistance

Two parts by weight of a plasticizer diisononyl phthalate and one part by weight of thermally foamable microspheres are charged in a glass test tube to prepare a plasticizer solution. This plasticizer solution is heated at 140° C. using an oil bath to observe whether or not foaming takes place and to what degree the viscosity of the plasticizer solution is increased, with the lapse of time.

(6) Expansion Ratio in Plasticized PVC Sheet

Three parts by weight of thermally foamable microspheres are added to a total of 100 parts by weight of 50 parts by weight of polyvinyl chloride resin (S903 made by Kureha Chemical Industry Co., Ltd.) and 50 parts by weight of dioctyl phthalate (DOP) to prepare a compound. This compound is roll kneaded at 120° C. for 2 minutes to make a 1 mm-thick sheet. This sheet is cut into a test piece 3×4 cm square, which is foamed in an oven of 200° C. for 5 minutes and 10 minutes, respectively. The expansion ratio (%) is calculated by measuring the specific gravity of the test piece before and after foaming.

Comparative Example 1

A total of 470 grams of an aqueous dispersion medium was prepared, which consisted of 80.5 grams of colloidal silica having a solid content of 20%, 3.0 grams of a 50% aqueous solution of a diethanolamine-adipic acid condensation product, 164.1 grams of sodium chloride, 2.2 grams of a 2.5% aqueous solution of potassium bichromate, 0.1 gram of hydrochloric acid and deionized water.

On the other hand, a polymerizable mixture was prepared, which consisted of 141.7 grams of acrylonitrile, 67.1 grams of methacrylonitrile, 11.2 grams of methyl methacrylate, 0.67 gram of a trifunctional crosslinkable monomer trimethylolpropane trimethacrylate, 26.1 grams of n-pentane, 14.9 grams of petroleum ether and 1.1 grams of azobisisobutyronitrile (the weight % of the monomer components=acrylonitrile/methacrylonitrile/methyl methacrylate=64.4/30.5/5.1; the amount of the crosslinkable monomer used=0.3% by weight of the monomer components).

This polymerizable mixture and the aqueous dispersion medium were stirred and mixed together in such a batchwise high-speed rotation, high-shear type dispersing machine as shown in FIG. 4, thereby forming minute droplets of the polymerizable mixture. The aqueous dispersion medium containing a minute droplet form of polymerizable mixture was charged in a polymerization vessel (1.5 L) having a stirrer, wherein a 20-hour reaction was carried out at 60° C. using a warm water bath.

The obtained reaction product was repeatedly filtrated and washed with water using a centrifugal machine to obtain a wet cake, which was then dried round the clock, thereby obtaining thermally foamable micro-spheres (MS-A) having an average particle diameter of about 25 μm and a coefficient of particle diameter distribution variation of 1.7%.

The expansion ratio (maximum expansion ratio) of the thermally foamable microspheres (MS-A) was found to be about 50 at 170° C. The results are shown in Table 1. This Comparative Example 1 was carried out according to Example 2 of JP-B 5-15499.

Example 1

Thermally foamable microspheres (MS-1) having an average particle diameter of about 26 μm and a coefficient of particle diameter distribution variation of 1.7% were obtained in the same manner as in Comparative Example 1 except that 3.5 grams of a bifunctional crosslinkable monomer diethylene glycol dimethacrylate (the amount of the crosslinkable monomer used=1.6% by weight of the monomer components) were used instead of 0.67 gram of the trifunctional crosslinkable monomer trimethylolpropane trimethacrylate.

The expansion ratio (maximum expansion ratio) of the thermally foamable microspheres (MS-1) was found to be about 50 at 170° C. The results are shown in Table 1.

Comparative Example 2

Thermally foamable microspheres (MS-B) having an average particle diameter of about 26 μm were obtained in the same manner as in Comparative Example 1 except that the amount of the trifunctional crosslinkable monomer trimethylolpropane trimethacrylate used was changed from 0.67 gram to 3.5 grams.

The thermally foamable microspheres (MS-B) were hardly foamed anywhere exceeding 140° C., because the resin components forming the shells were crosslinked together to such a high degree that they lost greatly their own thermoplastic resin properties. The results are shown in Table 1.

TABLE 1

|  | Comp. Ex. 1 | Example 1 | Comp. Ex. 2 |
|---|---|---|---|
| Monomer (wt. %) |  |  |  |
| Acrylonitrile | 64.4 | 64.4 | 64.4 |
| Methacrylonitrile | 30.5 | 30.5 | 30.5 |
| Methyl methacrylate | 5.1 | 5.1 | 5.1 |
| Crosslinkable monomer |  |  |  |
| (1) Trimethylolpropane trimethacrylate | 0.3 | — | 1.6 |
| (2) Diethylene glycol Dimethacrylate | — | 1.6 | — |
| Microsphere |  |  |  |
| Average particle diameter (μm) | 25 | 26 | 26 |
| Max. Expansion ratio | 50 | 50 | No foaming |
| Foaming behavior in EVA emulsion (*1) |  |  |  |
| Upon foamed at 170° C. | 5.5 | 5.5 | — |
| Upon foamed at 190° C. | 3.7 | 4.3 | — |
| Modulus of elasticity of shell polymer (N/m$^2$) |  |  |  |
| Measured at 140° C. | 35 × 10$^6$ | 50 × 10$^6$ | — |
| Measured at 190° C. | 9.0 × 10$^6$ | 14.5×10$^6$ | — |
| Chemical resistance |  |  |  |
| Plasticizer solution (*2) was heated to 140° C. | (A) | (B) | — |

Note
(*1): The thickness ratio before and after foaming of the EVA emulsion coating layer containing thermally foamable microspheres.
(*2): The plasticizer solution is composed of 2 parts by weight of diisononyl phthalate and 1 part by weight of thermally foamable microspheres.
(A): A portion of the solution was foamed with increased viscosity after 6 minutes.
(B): The solution was not foamed at all even after the lapse of 7 minutes.

Considerations

The thermally foamable microspheres (MS-1) of Example 1 have a maximum expansion ratio of as high as 50 at the foaming temperature of 170° C., irrespective of the amount of the crosslinkable monomer used exceeding 1% by weight of the monomer components. In contrast to this, the thermally foamable microspheres (MS-B) of Comparative Example 2 using the trifunctional crosslinkable monomer at a proportion of 1.6% by weight of the monomer components are substantially deprived of thermal foaming capability because the shell-forming polymer is crosslinked up to a high level.

Referring to the foaming behaviors of the micro-spheres in the EVA emulsions, MS-1 of Example 1 shows an expansion ratio of 5.5 at 170° C. at which the maximum expansion ratio was obtained, maintaining the same high expansion ratio as that of MS-A, although the amount of the crosslinkable monomer is 5.2 times on a weight basis (5.2 times on a molar basis) as large as that in MS-A of Comparative Example 1. In addition, the expansion ratio of MS-1 at a higher temperature of 190° C. is 4.3 that is still higher than 3.7 for MS-A, indicating that MS-1 has improved heat resistance.

Referring then to the modulus of elasticity of the shell polymers at 140° C., that of MS-1 of Example 1 is 1.4 times as high as that of MS-A of Comparative Example 1 that is a typical conventional thermally foamable microsphere. In other words, it is found that the thermally foamable microsphere of the present invention is resistant to higher shear force and excellent in heat resistance. At a higher temperature of 190° C., the modulus of elasticity of the shell polymer of MS-1 according to Example 1 is 1.6 times as high as that of MS-A according to Comparative Example 1. This means that the thermally foamable microsphere of the present invention can keep the expansion ratio high because the particle is less susceptible to shrinkage, and ensures a far wider range of temperature well suited for processing than ever before.

Referring to the evaluation of chemical resistance, the plasticizer solution containing MS-A of Comparative Example 1 was locally foamed after heated at 140° C. for 6 minutes, with the result of a noticeable viscosity increase. By contrast, the plasticizer solution containing MS-1 of Example 1 did not show any local foaming after heated at 140° C. for 6 minutes, and did not even after the lapse of a further 7 minutes, either.

Comparative Example 3

A total of 520 grams of an aqueous dispersion medium was prepared, which consisted of 12 grams of colloidal silica, 1.4 grams of a diethanolamine-adipic acid condensation product, 154 grams of sodium chloride, 0.12 gram of sodium nitrite, 0.2 gram of hydrochloric acid and deionized water.

On the other hand, a polymerizable mixture was prepared, which consisted of 130 grams of acrylonitrile, 60 grams of methacrylonitrile, 10 grams of isobornyl methacrylate, 1 gram of a trifunctional crosslinkable monomer trimethylolpropane trimethacrylate, 38 grams of n-pentane, and 1.2 grams of azobisisobutyronitrile (the weight % of the monomer components=acrylonitrile/methacrylonitrile/isobornyl methacrylate=65/30/5; the amount of the crosslinkable monomer used=0.5% by weight of the monomer components).

This polymerizable mixture and the aqueous dispersion medium were stirred and mixed together in such a batchwise high-speed rotation, high-shear type dispersing machine as shown in FIG. 4, thereby forming minute droplets of the polymerizable mixture.

The aqueous dispersion medium containing a minute droplet form of polymerizable mixture was charged in a polymerization vessel (1.5 L) having a stirrer, wherein a 22-hour reaction was carried out at 60° C. using a warm water bath. The obtained reaction product was repeatedly filtrated and washed with water using a centrifugal machine to obtain a wet cake, which was then dried for a whole day and night, thereby obtaining thermally foamable microspheres (MS-C) having an average particle diameter of about 28 μm and a coefficient of particle diameter distribution variation of 1.8%.

The expansion ratio (maximum expansion ratio) of the thermally foamable microspheres (MS-C) was found to be about 55 at 170° C. This Comparative Example 3 was carried out according to Example 2 of JP-A 5-285376. The results are set out in Table 2.

Example 2

Thermally foamable microspheres (MS-2) having an average particle diameter of about 30 μm and a coefficient of particle diameter distribution variation of 1.6% were obtained in the same manner as in Comparative Example 3 except that 3.5 grams of a bifunctional crosslinkable monomer diethylene glycol dimethacrylate (the amount of the crosslinkable monomer used=1.6% by weight of the monomer components) were used instead of 1 gram of the trifunctional crosslinkable monomer trimethylolpropane trimethacrylate.

The expansion ratio (maximum expansion ratio) of the thermally foamable microspheres (MS-2) was found to be about 55 at 170° C. The results are set out in Table 2.

TABLE 2

|  | Comparative Example 3 | Example 2 |
|---|---|---|
| Monomer (wt. %) | | |
| Acrylonitrile | 65.0 | 65.0 |
| Methacrylonitrile | 30.0 | 30.0 |
| Isobornyl methacrylate | 5.0 | 5.0 |
| Crosslinkable monomer | | |
| (1) Trimethylolpropane trimethacrylate | 0.5 | — |
| (2) Diethylene glycol Dimethacrylate | — | 1.6 |
| Microsphere | | |
| Average particle diameter (μm) | 28 | 30 |
| Max. expansion ratio | 55 | 55 |
| Modulus of elasticity of shell polymer (N/m$^2$) | | |
| Measured at 194° C. | $15 \times 10^6$ | $15 \times 10^6$ |
| Measured at 210° C. | $5.3 \times 10^6$ | $14 \times 10^6$ |

Considerations

Referring to the modulus of elasticity of the shell polymers at a measurement temperature of 194° C., that of the thermally foamable microsphere (MS-2) according to Example 2 was much the same as that of MS-C according to Comparative Example 3 that is a typical conventional thermally foamable microsphere. At a higher measurement temperature of 210° C., however, the modulus of elasticity of the shell polymer of MS-2 is found to be 2.6 times as high as that of MS-C.

It is also found that in a temperature range from 194° C. to 210° C., the decrease in the modulus of elasticity of the shell polymer of MS-2 according to Example 2 is very limited. This means that the thermally foamable microsphere of the present invention can kept the expansion ratio high because the particle is less susceptible to shrinkage in the high temperature region, and that a far wider range of processing temperature than ever before is ensured. To put it another way, the microsphere of the present invention has resistance to much higher shear force, and heat as well.

Example 3

An aqueous dispersion medium was prepared by charging in a polymerization vessel (1.5 L) having a stirrer a total of 557 grams of 16.5 grams of colloidal silica, 1.6 grams of a diethanolamine-adipic acid condensation product, 169.8 grams of common salt, 0.11 gram of sodium nitrite, and water. By the addition of hydrochloride acid the pH of the aqueous dispersion medium was regulated to 3.2.

On the other hand, a polymerizable mixture was prepared, which consisted of 147.4 grams of acrylonitrile, 70.4 grams of methacrylonitrile, 2.2 grams of methyl methacrylate, 3.5 grams of diethylene glycol dimethacrylate, 41.8 grams of isopentane and 1.32 grams of azobisisobutyronitrile (the weight % of the monomer components=acrylonitrile/methacrylonitrile/methyl methacrylate=67/32/1; the amount of the crosslinkable monomer used=1.6% by weight of the monomer components).

This polymerizable mixture and the aqueous dispersion medium prepared as already referred to were stirred and mixed together in such a batch-wise high-speed rotation, high-shear type dispersing machine as shown in FIG. 4, thereby forming minute droplets of the polymerizable mixture.

The aqueous dispersion medium containing a minute droplet form of polymerizable mixture was charged in a polymerization vessel (1.5 L) having a stirrer, wherein a 45-hour reaction was carried out at 60° C. using a warm water bath. The obtained reaction product was repeatedly filtrated and washed with water to obtain a wet cake, which was then dried, thereby obtaining thermally foamable microspheres (MS-3) having an average particle diameter of about 30 μm and a coefficient of particle diameter distribution variation of 1.8%.

The expansion ratio (maximum expansion ratio) of the thermally foamable microspheres (MS-3) was found to be about 50 at 170° C. The results are reported in Table 3.

Example 4

Thermally foamable microspheres (MS-4) having an average particle diameter of about 30 μm and a coefficient of particle diameter distribution variation of 2.1% were obtained in the same manner as in Example 3 except that the amounts of the monomers charged were varied in such a way as to give such a weight ratio of the monomer components charged as represented by acrylonitrile/methacrylonitrile=70/30.

The expansion ratio (maximum expansion ratio) of the thermally foamable microspheres (MS-4) was found to be about 50 at 170° C. The results are reported in Table 3.

Comparative Example 4

Thermally foamable microspheres (MS-D) having an average particle diameter of about 30 μm and a coefficient of particle diameter distribution variation of 1.6% were obtained in the same manner as in Example 3 except that 0.6 gram of a trifunctional crosslinkable monomer trimethylolpropane trimethacrylate (the amount of the crosslinkable monomer used=0.3% by weight of the monomer components) was used in place of 3.5 grams of the bifunctional crosslinkable monomer diethylene glycol dimethacrylate. The expansion ratio (maximum expansion ratio) of the thermally foamable microspheres (MS-D) was found to be about 50 at 170° C. The results are reported in Table 3.

Comparative Example 5

Thermally foamable microspheres (MS-E) having an average particle diameter of about 30 μm and a coefficient of particle diameter distribution variation of 1.9% were obtained in the same manner as in Example 4 except that 0.6 gram of a trifunctional crosslinkable monomer trimethylolpropane trimethacrylate (the amount of the crosslinkable monomer used=0.3% by weight of the monomer components) was used in place of 3.5 grams of the bifunctional crosslinkable monomer diethylene glycol dimethacrylate. The expansion ratio (maximum expansion ratio) of the thermally foamable microspheres (MS-E) was found to be about 50 at 170° C. The results are reported in Table 3.

TABLE 3

|  | Ex. 3 | Ex. 4 | Comp. Ex. 4 | Comp. Ex. 5 |
|---|---|---|---|---|
| Monomer (wt. %) | | | | |
| Acrylonitrile | 67.0 | 70.0 | 67.0 | 70.0 |
| Methacrylonitrile | 32.0 | 30.0 | 32.0 | 30.0 |
| Methyl methacrylate | 1.0 | — | 1.0 | — |
| Crosslinkable monomer | | | | |
| (1) Trimethylolpropane trimethacrylate | — | — | 0.3 | 0.3 |
| (2) Diethylene glycol dimethacrylate | 1.6 | 1.6 | — | — |
| Microsphere | | | | |
| Average particle diameter (mm) | 30 | 30 | 30 | 30 |
| Max. expansion ratio | 50 | 50 | 50 | 50 |
| Plasticized PVC sheet (*1); Expansion ratio (%) in 200° C. oven (*2) | | | | |
| After 5 minutes | 250 | 250 | 180 | 200 |
| After 10 minutes | 220 | 170 | 120 | 125 |

Note:
(*1) One-mm thick sheet prepared by kneading 100 grams of a mixture of 50 parts by weight of PVC, 50 parts by weight of DOP and 3 parts by weight of thermally foamable microspheres using a rotating roll of 120° C. for 2 minutes.
(*2) Expansion ratios (%) were calculated from specific gravity measurements of a sheet 3 × 4 cm square before and after foaming in a 200° C. oven.

Considerations

Each of the plasticized PVC sheets containing the thermally foamable microspheres (MS-3 and MS-4) obtained in Examples 3 and 4 shows a high degree of expansion ratio after 5 minutes at 200° C., and maintains that high expansion ratio even after 10 minutes at 200° C.

In contrast to this, each of the plasticized PVC sheets containing the thermally foamable microspheres (MS-D and MS-E) of Comparative Examples 4 and 5 was found to undergo vigorous foaming at 120° C.; the expansion ratio after 5 minutes at 200° C. was low and there was a noticeable decrease in the expansion ratio after 10 minutes at 200° C. That is, the so-called "flattening" phenomenon was observed.

Comparative Example 6

An aqueous dispersion medium was prepared, using 5 grams of colloidal silica, 0.5 gram of a diethanolamineadipic acid condensation product, 0.12 gram of sodium nitrite and water in a total amount of 600 grams. By the addition of hydrochloric acid, the pH of the aqueous dispersion medium was regulated to 3.2.

On the other hand, a polymerizable mixture was prepared, which consisted of 120 grams of acrylonitrile, 66 grams of methyl methacrylate, 0.4 gram of a trifunctional crosslinkable monomer trimethylolpropane trimethacrylate, 70 grams of isopentane and 1.2 grams of 2,2'-azobis(2,4-dimethylvaleronitrile) (the weight % of the monomer components=acrylonitrile/methyl methacrylate=50/50; the amount of the crosslinkable monomer used=0.2% by weight of the monomer components).

This polymerizable mixture and the aqueous dispersion medium were stirred and mixed together in such a batchwise high-speed rotation, high-shear type dispersing machine as shown in FIG. 4, thereby preparing minute droplets of the polymerizable mixture.

The aqueous dispersion medium containing a minute droplet form of polymerizable mixture was charged in a polymerization vessel (1.5 L) having a stirrer, wherein a 22-hour reaction was carried out at 53° C. using a warm water bath. The obtained reaction product of pH 6.3 was repeatedly filtrated and washed with water. The resultant product was then dried, thereby obtaining thermally foamable microspheres (MS-F) having an average particle diameter of about 14 μm and a coefficient of particle diameter distribution variation of 1.6%.

The expansion ratio (maximum expansion ratio) of the thermally foamable microspheres (MS-F) was found to be about 18 at 145° C., and about 12 at 150° C. The results are reported in Table 4.

Example 5

Thermally foamable microspheres (MS-5) having an average particle diameter of about 15 μm and a coefficient of particle diameter distribution variation of 1.7% were obtained in the same manner as in Comparative Example 6 except that 3.2 grams of a bifunctional crosslinkable monomer diethylene glycol dimethacrylate (the amount of the crosslinkable monomer used=1.6% by weight of the monomer components) were used in place of 0.4 gram of the trifunctional crosslinkable monomer trimethylolpropane trimethacrylate.

This thermally foamable microsphere (MS-5) was found to have an expansion ratio (maximum expansion ratio) of about 40 at 145° C., and maintain a maximum expansion ratio of as high as about 40 even at an elevated foaming temperature of 150° C. The results are enumerated in Table 4.

TABLE 4

|  | Comparative Example 6 | Example 5 |
|---|---|---|
| Monomer (wt. %) | | |
| Acrylonitrile | 50.0 | 50.0 |
| Methyl methacrylate | 50.0 | 50.0 |
| Crosslinkable monomer | | |
| (1) Trimethylolpropane trimethacrylate | 0.2 | — |
| (2) Diethylene glycol Dimethacrylate | — | 1.6 |
| Microsphere | | |
| Average particle diameter (μm) | 14 | 15 |

TABLE 4-continued

|  | Comparative Example 6 | Example 5 |
|---|---|---|
| Expansion ratio | | |
| Foamed at 145° C. | 18 | 40 |
| Foamed at 150° C. | 12 | 40 |

Comparative Example 7

An aqueous dispersion medium was prepared, using 8.8 grams of colloidal silica, 0.8 gram of a diethanolamineadipic acid condensation product, 0.13 gram of sodium nitrite and water in a total amount of 528 grams.

On the other hand, a polymerizable mixture was prepared, which consisted of 143 grams of vinylidene chloride, 66 grams of acrylonitrile, 11 grams of methyl methacrylate, 0.33 gram of trimethylolpropane trimethacrylate, 2.2 grams of isopropylperoxy dicarbonate and 35.2 grams of isobutane (the weight % of the monomer components=vinylidene chloride/acrylonitrile/methyl methacrylate=65/30/5; the amount of the crosslinkable monomer used=0.15% by weight of the monomer components).

This polymerizable mixture and the aqueous dispersion medium prepared as referred to above were stirred and mixed together by means of such a batch-wise high-speed rotation, high-shear type dispersing machine as shown in FIG. 4 to form minute droplets of the polymerizable mixture, which were charged into a polymerization vessel wherein a 22-hour reaction was carried out at 50° C. The obtained reaction product was repeatedly filtrated and washed with water, and then dried, thereby obtaining thermally foamable microspheres (MS-G) having an average particle diameter of about 15 μm and a coefficient of particle diameter distribution variation of 1.6%.

This thermally foamable microsphere (MS-G) was found to have an expansion ratio (maximum expansion ratio) of about 50 at 120° C. At an elevated foaming temperature of 130° C., however, the expansion ratio plummeted down to about 18. The results are enumerated in Table 5.

Example 6

Thermally foamable microspheres (MS-6) having an average particle diameter of about 15 μm and a coefficient of particle diameter distribution variation of 1.7% were obtained in the same manner as in Comparative Example 7 except that 3.5 grams of a bifunctional crosslinkable monomer diethylene glycol dimethacrylate (the amount of the crosslinkable monomer used=1.6% by weight of the monomer components) were used in place of 0.33 gram of the trifunctional crosslinkable monomer trimethylolpropane trimethacrylate.

This thermally foamable microsphere (MS-6) was found to have an expansion ratio (maximum expansion ratio) of about 50 at 120° C., and maintain an expansion ratio of as high as about 35 even at an elevated foaming temperature of 130° C. The results are enumerated in Table 5.

TABLE 5

|  | Comp. Ex. 7 | Example 6 |
|---|---|---|
| Monomer (wt. %) | | |
| Vinylidene chloride | 65.0 | 65.0 |
| Acrylonitrile | 30.0 | 30.0 |
| Methyl methacrylate | 5.0 | 5.0 |
| Crosslinkable monomer | | |
| (1) Trimethylolpropane trimethacrylate | 0.15 | — |
| (2) Diethylene glycol Dimethacrylate | — | 1.6 |
| Microsphere | | |
| Average particle diameter (μm) | 15 | 15 |
| Expansion ratio | | |
| Foamed at 120° C. | 50 | 50 |
| Foamed at 130° C. | 18 | 35 |

Example 7

Thermally foamable microspheres (MS-7) having an average particle diameter of about 25 μm and a coefficient of particle diameter distribution variation of 0.3% were obtained in the same manner as in Comparative Example 1 except that 3.5 grams of a bifunctional crosslinkable monomer diethylene glycol dimethacrylate (the amount of the cross-linkable monomer used=1.6% by weight of the monomer components) were used in lieu of 0.67 gram of the tri-functional crosslinkable monomer trimethylolpropane trimethacrylate and that when the polymerizable mixture and aqueous dispersion medium were stirred and mixed together, the aqueous dispersion medium and polymerizable mixture were each held in a separate vessel, as shown in FIG. 2, and they were continuously passed from the respective vessels at a given constant ratio through a continuous high-speed rotation, high-shear type stirring/dispersing machine, followed by suspension polymerization.

This thermally foamable microsphere (MS-7) was found to have an expansion ratio (maximum expansion ratio) of about 50 at 170° C. A plasticizer solution containing such thermally foamable microspheres (MS-7) were free from any local foaming even after held at 140° C. for 8 minutes. On the other hand, a plasticizer solution containing the thermally foamable microspheres (MS1) of Example 1 was found to start some, if not large, local foaming after the lapse of 8 minutes, presumably for the reasons of the effects of the type and amount of the crosslinkable monomer used as well as the fact that the particle diameter distribution of MS-7 is sharper than that of MS-1.

Example 8

Thermally foamable microspheres (MS-8) having an average particle diameter of about 30 μm and a sharp particle diameter distribution as expressed by a coefficient of particle diameter distribution variation of 0.3% were obtained in the same manner as in Example 3 except that when the polymerizable mixture and aqueous dispersion medium were stirred and mixed together, the aqueous dispersion medium and polymerizable mixture were each held in a separate vessel, as shown in FIG. 2, and they were continuously passed from the respective vessels at a given constant ratio through a continuous high-speed rotation, high-shear type dispersing machine, followed by suspension polymerization.

This thermally foamable microsphere (MS-8) was found to have an expansion ratio (maximum expansion ratio) of about 50 at 170° C.

The thickness of a plasticized PVC sheet (see Table 3) containing the thermally foamable microspheres (MS-3) of Example 3 was found to be about 10% larger than that of an MS-3 free plasticized PVC sheet on the basis of a 1-mm thick sheet prepared by a 2-minute kneading on a rotating roll of 120° C.

In contrast to this, the thickness of a plasticizer PVC sheet containing the thermally foamable microspheres (MS-8) was found to remain substantially similar to that of an MS-8 free plasticized PVC sheet on the basis of a 1-mm thick sheet prepared by a 2-minute kneading on a rotating roll of 120° C. It follows that MS-8 is improved in local foaming properties on roll kneading (or less susceptible to local foaming).

Example 9

Thermally foamable microspheres (MS-9) having an average particle diameter of about 15 μm and a sharp particle diameter distribution as expressed by a coefficient of particle diameter distribution variation of 0.5% were obtained in the same manner as in Example 5 except that when the polymerizable mixture and aqueous dispersion medium were stirred and mixed together, the aqueous dispersion medium and polymerizable mixture were each held in a separate vessel, as shown in FIG. 2, and they were continuously passed from the respective vessels at a given constant ratio through a continuous high-speed rotation, high-shear type dispersing machine, followed by suspension polymerization. This thermally foamable microsphere (MS-9) was found to have an expansion ratio (maximum expansion ratio) of about 40 at 145° C., and maintain a maximum expansion ratio of about 40 even at an elevated foaming temperature of 150° C.

MS-9 and MS-5 (Example 5) were each coated on double-coated paper according to the measuring method of expansion ratio in a binder system. As these wet-coated papers were dried at a heating rate of 1° C./minute in a drying machine, MS-5 was foamed at a temperature lower than was MS-9. This means that the use of thermally foamable microspheres having a sharp particle diameter distribution, like MS-9, makes it possible to apply high processing rates (high-speed, short-time drying).

Example 10

Thermally foamable microspheres (MS-10) having an average particle diameter of about 15 μm and a coefficient of particle diameter distribution variation of 0.2% were obtained in the same manner as in Example 6 except that when the polymerizable mixture and aqueous dispersion medium were stirred and mixed together, the aqueous dispersion medium and polymerizable mixture were each held in a separate vessel, as shown in FIG. 2, and they were continuously passed from the respective vessels at a given constant ratio through a continuous high-speed rotation, high-shear type dispersing machine, followed by suspension polymerization.

This thermally foamable microsphere (MS-10) was found to have an expansion ratio (maximum expansion ratio) of about 50 at 120° C., and maintain a maximum expansion ratio of about 35 even at an elevated foaming temperature of 130° C.

As how MS-10 behaved on foaming was observed under a microscope having a hot stage at a heating rate of 5° C./minute, it was found that the thermally foamable microspheres (MS-10) were higher in the foaming temperature than the thermally foamable microspheres (MS-6) of Example 6. It is thus understood that MS-10 was sharply foamed.

INDUSTRIAL APPLICABILITY

The present invention provides a thermally foamable microsphere well suited for processing during which it receives strong shear force, such as kneading, calendering, extrusion, and injection molding, and its production process. The present invention also provides a thermally foamable microsphere in which the modulus of elasticity of the shell formed of a polymer is less dependent on temperature, and its production process. The thermally foamable microspheres of the invention are processable in a wider processing temperature range than ever before, and have high chemical and solvent resistance and the high ability to maintain foaming capability. Furthermore, the invention provides a thermally foamable microsphere that combines the aforesaid properties with an extremely reduced coefficient of particle diameter distribution variation and sharpness of foaming.

The invention claimed is:

1. A thermally foamable microsphere having a structure in which a foaming agent is encapsulated in a shell formed of a polymer, wherein:
   (1) the shell formed of a polymer is formed of:
      (a) a vinylidene chloride (co)polymer obtained by polymerization of vinylidene chloride alone or a mixture of vinylidene chloride with a vinyl monomer copolymerizable therewith as a polymerizable monomer, and a tri- or poly-functional crosslinkable monomer having three or more polymerizable carbon-carbon double bonds, or
      (b) a (meth)acrylonitrile co(polymer) obtained by polymerization of (meth)acrylonitrile alone or a mixture of (meth)acrylonitrile with a vinyl monomer copolymerizable therewith as a polymerizable monomer, and a tri- or poly-functional crosslinkable monomer having three or more polymerizable carbon-carbon double bonds,
   wherein the crosslinkable monomer is used at a proportion of 1.1 to 5% by weight based on the polymerizable monomer, and
   (2) a maximum expansion ratio of the thermally foamable microsphere is at least 5.

2. The thermally foamable microsphere according to claim 1, wherein the vinylidene chloride (co)polymer is a co(polymer) that is obtained using as polymerizable monomers (A) 30 to 100% by weight of vinylidene chloride and (B) 0 to 70% by weight of at least one monomer selected from the group consisting of acrylonitrile, methacrylonitrile, acrylic ester, methacrylic ester, styrene and vinyl acetate.

3. The thermally foamable microsphere according to claim 1, wherein the vinylidene chloride (co)polymer is a copolymer that is obtained using as polymerizable monomers (A1) 40 to 80% by weight of vinylidene chloride, (B1) 0 to 60% by weight of at least one monomer selected from the group consisting of acrylonitrile and methacrylonitrile, and (B2) 0 to 60% by weight of at least one monomer selected from the group consisting of acrylic ester and methacrylic ester.

4. The thermally foamable microsphere according to claim 1, wherein the (meth)acrylonitrile (co)polymer is a (co)polymer that is obtained using as polymerizable monomers (C) 30 to 100% by weight of at least one monomer selected from the group consisting of acrylonitrile and methacrylonitrile and (D) 0 to 70% by weight of at least one monomer selected from the group consisting of vinylidene chloride, acrylic ester, methacrylic ester, styrene and vinyl acetate.

5. The thermally foamable microsphere according to claim 4, wherein the (meth)acrylonitrile (co)polymer is a (co)polymer that is obtained using as polymerizable monomers (C) 80 to 100% by weight of at least one monomer selected from the group consisting of acrylonitrile and methacrylonitrile and (D) 0 to 20% by weight of at least one monomer selected from the group consisting of vinylidene chloride, acrylic ester, methacrylic ester, styrene and vinyl acetate.

6. The thermally foamable microsphere according to claim 4, wherein the (meth)acrylonitrile (co)polymer is a copolymer that is obtained using as polymerizable monomers (C) 30% by weight to less than 80% by weight of at least one monomer selected from the group consisting of acrylonitrile and methacrylonitrile and (D) greater than 20% by weight up to 70% by weight of at least one monomer selected from the group consisting of vinylidene chloride, acrylic ester, methacrylic ester, styrene and vinyl acetate.

7. The thermally foamable microsphere according to claim 1, wherein the (meth)acrylonitrile (co)polymer is a copolymer that is obtained using as polymerizable monomers (C1) 51 to 100% by weight of at least one monomer selected from the group consisting of acrylonitrile and methacrylonitrile, (D1) 0 to 40% by weight of vinylidene chloride, and (D2) 0 to 48% by weight of at least one monomer selected from the group consisting of acrylic ester and methacrylic ester.

8. The thermally foamable microsphere according to claim 1, wherein the (meth)acrylonitrile (co)polymer is a (co)polymer that is obtained using as polymerizable monomers (E) 30 to 100% by weight of at least one monomer selected from the group consisting of acrylonitrile and methacrylonitrile and (F) 0 to 70% by weight of at least one monomer selected from the group consisting of acrylic ester and methacrylic ester.

9. The thermally foamable microsphere according to claim 1, wherein the (meth)acrylonitrile (co)polymer is a copolymer that is obtained using as polymerizable monomers (E1) 1 to 99% by weight of acrylonitrile, (E2) 1 to 99% by weight of methacrylonitrile and (F) 0 to 70% by weight of at least one monomer selected from the group consisting of acrylic ester and methacrylic ester.

10. The thermally foamable microsphere according to claim 1, wherein the (meth)acrylonitrile (co)polymer is a copolymer that is obtained using as polymerizable monomers (E1) 20 to 80% by weight of acrylonitrile, (E2) 20 to 80% by weight of methacrylonitrile and (F) 0 to 20% by weight of at least one monomer selected from the group consisting of acrylic ester and methacrylic ester.

11. The thermally foamable microsphere according to claim 1, which has an average particle diameter of 3 to 100 μm and a coefficient of particle diameter distribution variation of 1.5% or less.

12. The thermally foamable microsphere according to claim 1, wherein the shell formed of a polymer is formed of a vinylidene chloride (co)polymer, and a ratio ($R_2/R_1$) of an expansion ratio $R_2$ at a temperature 10° C. higher than a temperature at which a maximum expansion ratio $R_1$ is obtained to the maximum expansion ratio $R_1$ is 0.8 to 0.4.

13. The thermally foamable microsphere according to claim 1, wherein the shell formed of a polymer is formed of a (meth)acrylonitrile (co)polymer, and a ratio ($R_2/R_1$) of an expansion ratio $R_2$ at a temperature 10° C. higher than a temperature at which a maximum expansion ratio $R_1$ is obtained to the maximum expansion ratio $R_1$ is 1 to 0.8.

14. A process for producing a thermally foamable microsphere having a structure in which the foaming agent is encapsulated in a shell formed of a polymer that is obtained by subjecting a polymerizable mixture containing at least a foaming agent, a polymerizable monomer and a crosslinkable monomer to suspension polymerization in an aqueous dispersion medium, the process comprising subjecting the polymerizable mixture to suspension polymerization wherein the polymerizable mixture contains a tri- or polyfunctional crosslinkable monomer having three or more polymerizable carbon-carbon double bonds at a proportion of 1.1 to 5 % by weight based on the polymerizable monomer, to obtain a thermally foamable microsphere having a maximum expansion ratio of at least 5, and
  wherein the polymerizable monomer is a monomer or a monomer mixture selected from the group consisting of:
  (a) vinylidene chloride alone or a mixture of vinylidene chloride with a vinyl monomer copolymerizable therewith, and
  (b) (meth)acrylonitrile alone or a mixture of (meth)acrylonitrile with a vinyl monomer copolymerizable therewith.

15. The production process according to claim 14, wherein the aqueous dispersion medium contains as a dispersion stabilizer colloidal silica, and a condensation product of diethanolamine and an aliphatic dicarboxylic acid.

16. The production process according to claim 14, wherein the aqueous dispersion medium contains as a polymerization aid at least one compound selected from the group consisting of an alkaline metal nitrite, stannous chloride, stannic chloride, water-soluble ascorbic acids and boric acid.

17. The production process according to claim 14, wherein the aqueous dispersion medium and the polymerizable mixture are fed in a continuous high-speed rotation, high-shear type stirring/dispersing machine in which both are continuously stirred and dispersed, and the resulting dispersion is poured in a polymerization vessel in which suspension polymerization is carried out.

18. The production process according to claim 14, wherein the aqueous dispersion medium and the polymerizable mixture are fed in a batch-wise high-speed rotation, high-shear type stirring/dispersing machine in which both are continuously stirred and dispersed, and the resulting dispersion is poured in a polymerization vessel in which suspension polymerization is carried out.

19. The thermally foamable microsphere according to claim 1, wherein the crosslinkable monomer is used at a proportion of 1.2 to 5% by weight based on the polymerizable monomer.

20. The thermally foamable microsphere according to claim 1, wherein the crosslinkable monomer is used at a proportion of 1.3 to 4% by weight based on the polymerizable monomer.

21. The production process according to claim 14, wherein the polymerizable mixture contains the tri- or poly-functional crosslinkable monomer at a proportion of 1.2 to 5% by weight based on the polymerizable monomer.

22. The production process according to claim 14, wherein the polymerizable mixture contains the tri- or poly-functional crosslinkable monomer at a proportion of 1.3 to 4% by weight based on the polymerizable monomer.

* * * * *